(12) United States Patent
Yuen et al.

(10) Patent No.: US 11,431,234 B2
(45) Date of Patent: Aug. 30, 2022

(54) ROTOR ASSEMBLY FOR DC MOTOR

(71) Applicant: JOHNSON ELECTRIC INTERNATIONAL AG, Murten (CH)

(72) Inventors: Cheong Wing Yuen, Hong Kong (CN); Chi Yan Tam, Hong Kong (CN); Chi Hung Jacky Chan, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 16/982,969

(22) PCT Filed: Mar. 21, 2018

(86) PCT No.: PCT/CN2018/079913
§ 371 (c)(1),
(2) Date: Sep. 21, 2020

(87) PCT Pub. No.: WO2019/178788
PCT Pub. Date: Sep. 26, 2019

(65) Prior Publication Data
US 2021/0021184 A1 Jan. 21, 2021

(30) Foreign Application Priority Data
Mar. 20, 2018 (WO) ................ PCT/CN2018/079651

(51) Int. Cl.
*H02K 23/66* (2006.01)
*H02K 13/14* (2006.01)

(52) U.S. Cl.
CPC ............ *H02K 23/66* (2013.01); *H02K 13/14* (2013.01)

(58) Field of Classification Search
CPC ...... H02K 23/66; H02K 13/14; H02K 11/028; H02K 13/06
USPC .................................... 310/72, 67 R
See application file for complete search history.

(56) References Cited

U.S. PATENT DOCUMENTS

2016/0319165 A1\* 11/2016 Choi ..................... C09J 7/22

FOREIGN PATENT DOCUMENTS

| CN | 1374735 | A | | 10/2002 |
|----|---------|---|---|---------|
| GB | 2177854 | | * | 1/1987 |
| GB | 2389242 | | * | 12/2003 |
| JP | 57074678 | | | 5/1982 |
| JP | H08223888 | A | | 8/1996 |
| JP | H09140103 | | * | 5/1997 |
| JP | 11055905 | A | | 2/1999 |
| JP | 2004027134 | A | | 1/2004 |
| JP | 2006197754 | A | | 7/2006 |
| JP | 2008206347 | | * | 8/2008 |
| JP | 2008206347 | | * | 9/2008 |
| JP | 2009303408 | A | | 12/2009 |
| JP | 2009303408 | A | | 12/2009 |
| JP | 2009303409 | A | | 12/2009 |
| JP | 2009303410 | A | | 12/2009 |
| JP | 2012157116 | A | | 8/2012 |

(Continued)

*Primary Examiner* — Ahmed Elnakib
(74) *Attorney, Agent, or Firm* — Muncy, Geissler, Olds & Lowe, P.C.

(57) ABSTRACT

A rotor assembly for a DC motor is provided which includes a rotor having a rotor shaft, a commutator mounted to the rotor shaft, and a varistor which is connected to the commutator via an electrically-conductive solderless fixing means, such as an electrically-conductive adhesive.

9 Claims, 3 Drawing Sheets

(56) References Cited

FOREIGN PATENT DOCUMENTS

| | | | |
|---|---|---|---|
| JP | 6048194 | B2 | 12/2016 |
| WO | WO 9743352 | * | 11/1997 |

* cited by examiner

ROTOR ASSEMBLY FOR DC MOTOR

TECHNICAL FIELD

The present invention relates to a rotor assembly for a DC motor, preferably a brushed DC motor, in addition to a DC motor having such a rotor assembly. A method of forming a rotor assembly for a DC motor is also provided.

BACKGROUND ART

Direct current (DC) motors are widely used in a variety of contexts to provide motive force. DC motors, and particularly brushed DC motors, are internally commutated electric motors designed to be run from a direct current power source, and therefore are particularly suitable to being run via battery.

SUMMARY OF INVENTION

Technical Problem

One disadvantage of a brushed motor is the generation of voltage peaks or spikes when commutating. At a transition point where a brush contacts the commutator between two commutator segments, so as to commute and keep rotating the rotor of the motor, a rapid discharge of energy is generated from the energy which was in the previously energised coil. This discharge causes the voltage peaks, known as back EMF spikes, and can result in sparking. If this is not suppressed, there will result significant electromagnetic interference.

This issue has been previously addressed by improving the electromagnetic compatibility level of the motor, for example, by providing a varistor, or voltage-dependent resistor, in communication with the commutator. The varistor has a non-linear current-voltage characteristic, and is capable of protecting against excessive transient voltages, by deviation of the current generated by the transient voltages therethrough.

One example of a varistor used in connection with DC motors is one having the shape of a ring around the DC motor axis, which is electrically and mechanically connected to the commutator by soldering.

A disadvantage of such an arrangement is that the soldering can become mechanically unstable at high temperatures as the solder begins to melt and loosen the connection, particularly where the DC motor is operated for long periods or at high load. High temperatures are achieved not only due to high motor operation temperature, but also due to resistive self-heating of the motor windings, commutator and varistor when the motor is energised. If the varistor detaches, not only are the advantages of the varistor lost, resulting in a deterioration of the electromagnetic interference, but the dislodging can cause an electrical short-circuit or mechanical blockage in the motor. As such, there are limitations to the efficacy of a solder-joined varistor due to the low melting point of solder.

A further disadvantage of a solder join is that residual flux from the soldering process must be removed. The flux, being electrically non-conductive, if left on the commutator, can affect the electrical contact between the commutator and the brush during the normal commutation process. It is common practice in the art to use a solvent cleaning process to remove the flux, which can be environmentally hazardous and difficult to safely dispose of, which can significantly increase the cost of manufacture of the motor.

It is also possible that a dissolution reaction can occur between the solder and the metallized electrode, typically formed of copper and silver, on the varistor at high-temperature operation, as a result of eutectic behaviour. This corrodes the macrostructure of the solder and further weakening the support of the varistor, by delamination of the varistor electrode, resulting in electrical and mechanical disconnection between the varistor and the commutator. This reduces the operational life of the motor.

Solution to Problem

Technical Solution

The present invention seeks to provide an improved connection method for attaching the varistor to the commutator which avoids or reduces the above-referenced problems.

According to a first aspect of the invention, there is provided a rotor assembly for a DC motor, the rotor assembly comprising: a rotor having a rotor shaft; a commutator mounted to the rotor shaft; and a varistor connected to the commutator via an electrically-conductive solderless fixing means.

The removal of solder from the connection between the commutator and varistor advantageously eliminates the risk of dissolution reactions occurring between the solder and the metallized electrode on the varistor at high operation temperature. Furthermore, the electrically-conductive solderless fixing means can be formed so as to be thermally stable to a much greater temperature than solder alone, which can significantly increase the operational life of the DC motor incorporating the rotor assembly. Furthermore, electromagnetic interference can be suppressed by the resistor without such a great risk of mechanical failure which might damage or destroy the motor.

Preferably, the electrically-conductive solderless fixing means may comprise electrically-conductive adhesive.

The use of adhesive in lieu of solder advantageously improves the mechanical strength of the connection between the varistor and the commutator. Not only do the adhesion properties of the adhesive allow for a less brittle connection, but also the adhesive may demonstrate improved thermal resilience when compared with solder connections.

In one embodiment, the electrically-conductive adhesive may comprise a metallic conductive component, such as silver and/or nickel, and additionally, or alternatively, the electrically-conductive adhesive may comprise a non-metallic conductive component, such as graphite, graphene and/or carbon nanotubes.

Various different characteristic features of adhesive types may be more or less beneficial dependent upon the intended use of the DC motor, and may have significantly improved thermal resilience when compared with solder.

In an alternative embodiment, the electrically-conductive solderless fixing means may comprise an electrically-conductive casing of the varistor.

An alternative construction, in which the fixing means held the varistor captive relative to the commutator may be advantageous, since a connection could then be made which did not require any fluid component to be applied, as is the case for adhesive or solder.

Optionally, the electrically-conductive casing may be formed from an at least in part electrically-conductive plastics material.

An at least in part electrically-conductive plastics material has the advantage of protecting the varistor from damage, whilst also forming the necessary electrical connections to the commutator. Such an arrangement may simplify the final construction of the rotor assembly.

Preferably, the varistor may be provided as a looped element around the commutator.

Seating the varistor around the commutator allows for several radial fixing points to be achieved using the electrically-conductive solderless fixing means, further improving the mechanical stability of the rotor assembly.

In one embodiment, a plurality of electrodes of the varistor may be provided on a rotor-facing surface of the varistor. In another embodiment, a plurality of electrodes of the varistor may be provided on an opposite surface to a rotor-facing surface of the varistor.

The orientation of the electrodes of the varistor relative to the rotor coils may provide distinct advantages depending upon the method of application of the solderless electrically-conductive fixing means. For instance, when the electrodes are oriented to face away from the rotor coils, insertion of an adhesive applicator tool may be more straightforward, whilst a mating connection between the electrodes and an intermediate support conductor may make rotor-facing electrodes more appealing.

Optionally, the electrically-conductive solderless fixing means may bridge an air gap between the commutator and the varistor.

Maintaining an air gap between the commutator and the varistor not only provides some mechanical isolation, limiting the possibility of vibrational dislodging of the varistor in use, but also reduces the possibility of shorting the connections between the varistor and commutator due to unintentional contact.

The rotor assembly may further comprise a support element mounted at or adjacent to the commutator, the support element providing a mounting surface for the electrically-conductive solderless fixing means.

A support element may provide an additional structural foundation for supporting the varistor and/or the fixing means, resulting in a reduced likelihood of mechanical failure of the motor.

Preferably, the electrically-conductive solderless fixing means may comprise a flowable fixing material. Additionally, or alternatively, the electrically-conductive solderless fixing means may comprise a curable material, and/or a non-reversibly-applicable fixing means.

The use of a flowable fixing material, such as an adhesive, may provide a solder-like connection between the commutator and varistor, allowing the rotor assembly to be used within existing hardware constraints. A curable and/or non-reversibly-applicable fixing means may also be able to provide the advantages of solder without the thermal degradation properties associated with solder.

According to a second aspect of the invention, there is provided a DC motor comprising a stator, at least one brush, and a rotor assembly in accordance with the first aspect of the invention.

A DC motor having a rotor assembly as described above is considerably less likely to become damaged by high temperature or corrosive applications, and therefore the utility of such a motor can be greatly expanded.

According to a third aspect of the invention, there is provided a method of forming a rotor assembly for a DC motor, the method comprising the steps of: a] providing a rotor having a rotor shaft, and a commutator mounted to the rotor shaft; and b] connecting a varistor to the commutator via an electrically-conductive solderless fixing means.

Preferably, the electrically-conductive solderless fixing means may be provided as an electrically-conductive adhesive, the electrically-conductive adhesive being applied using any one of: dispensing the electrically-conductive adhesive via an adhesive dispenser; screen printing of the electrically-conductive adhesive; 3D printing of the electrically-conductive adhesive; air spraying of the electrically-conductive adhesive; wet dipping of the varistor and/or commutator into the electrically-conductive adhesive; and tape casting of the electrically-conductive adhesive.

Optionally, the electrically-conductive adhesive may be cured using any one of: addition curing; heat curing; radiation curing; anaerobic curing; and moisture curing According to a fourth aspect of the invention, there is provided a combination of a commutator and a varistor, the varistor being connected to the commutator via an electrically-conductive solderless fixing means.

ADVANTAGEOUS EFFECTS OF INVENTION

BRIEF DESCRIPTION OF DRAWINGS

Description of Drawings

Figure 1:
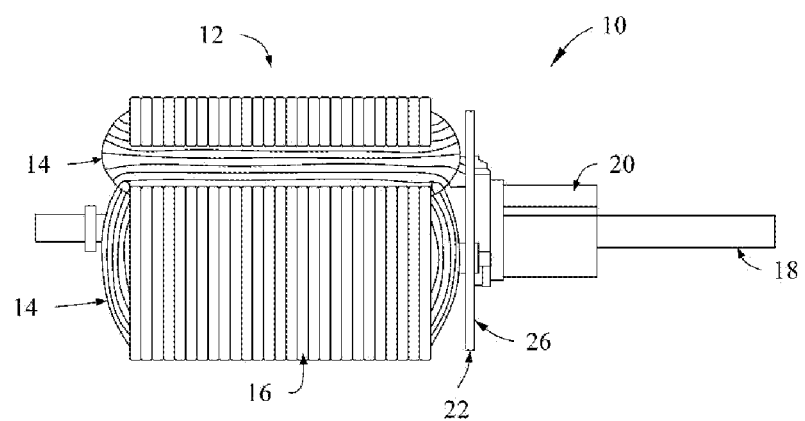
Figure 2:
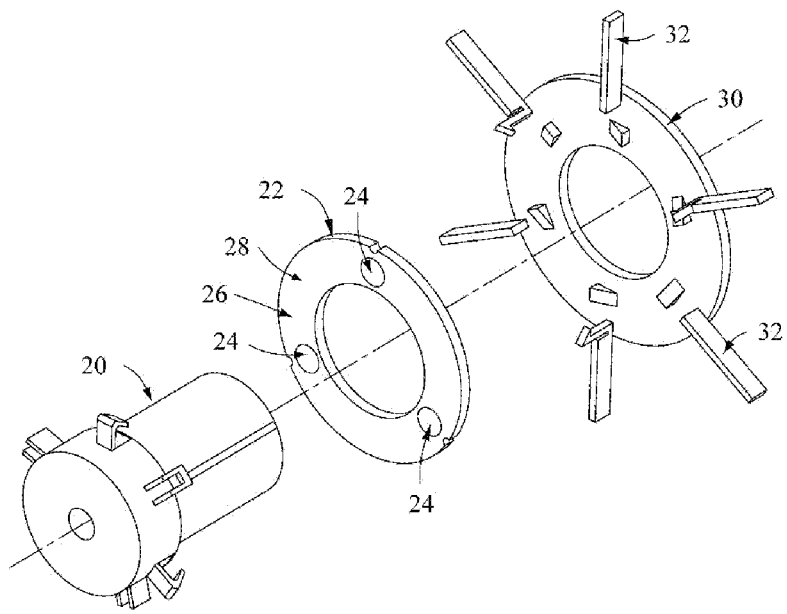
Figure 3:
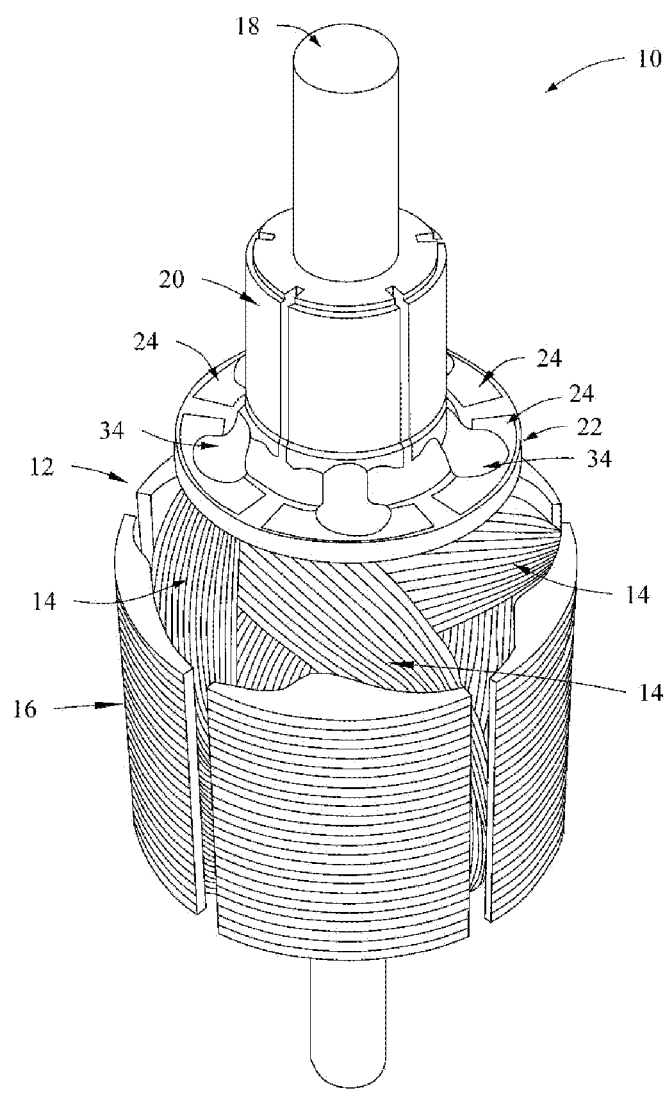
Figure 4:
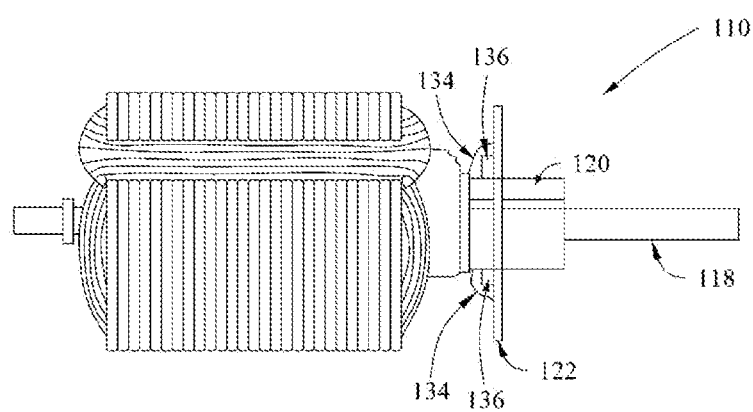
Figure 5:
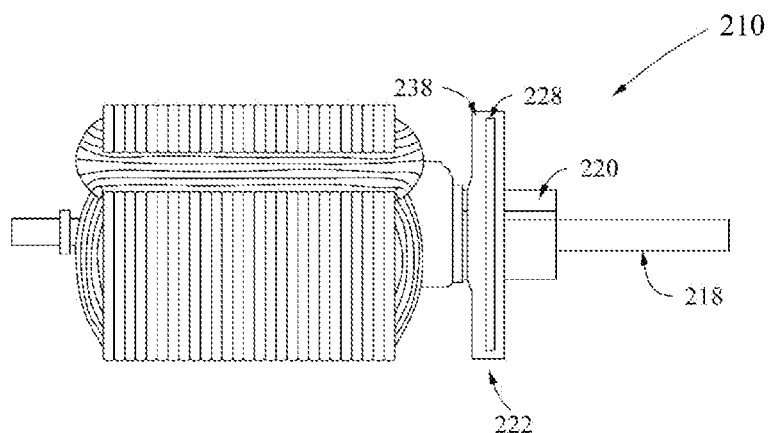

The invention will now be more particularly described, by way of example only, with reference to the accompanying drawings, in which:

FIG. 1 shows a side representation of one embodiment of a rotor assembly in accordance with the first aspect of the invention;

FIG. 2 shows an exploded perspective representation of the commutator and varistor of the rotor assembly of FIG. 1, inclusive of an optional heat sink element;

FIG. 3 shows a perspective representation of the rotor assembly of FIG. 1;

FIG. 4 shows a side representation of a second embodiment of a rotor assembly in accordance with the first aspect of the invention; and FIG. 5 shows a side representation of a third embodiment of a rotor assembly in accordance with the first aspect of the invention.

MODE FOR THE INVENTION

Mode for Invention

Referring firstly to FIG. 1, there is illustrated a rotor assembly, indicated globally at 10, suitable for a DC electric motor, which would ordinarily comprise a stator, preferably a plurality of brushes, and the rotor assembly 10.

The rotor assembly 10 includes a rotor 12, typically formed via a plurality of rotor coils 14 wound around an armature 16. The rotor 12 includes a rotor shaft 18, via which rotational motion can be output from the DC electric motor, which is preferably a brushed DC electric motor, to which is mounted or mountable a commutator 20.

A varistor 22, preferably formed as a looped element such as an annular varistor which is receivable around the commutator 20 over the rotor shaft 18. The varistor 22 here has a plurality of electrodes 24 on one of the planar surfaces 26 of the varistor material 28, via which an electrical connection can be made to the commutator. FIG. 2 shows an indicative exploded view of the commutator 20 and varistor 22. Three electrodes 24 are shown in the depicted embodiment, but the number of electrodes will be influenced by the number of rotor coils 14 forming the rotor 12. A heat sink element 30 may also be provided, which can improve the stability of the varistor 22. Here, the heat sink element 30 incorporates a plurality of fan elements 32 to improve radiative distribution of thermal energy generated at the varistor 22. Note that the heat sink element 30 is omitted from FIG. 1.

The electrical connection is made using an electrically-conductive fixing material or similar fixing means and is devoid of solder. This arrangement eliminates the risks involved with mechanical or chemical failure of a solder connection. Preferably, the electrically-conductive solderless fixing means may be devoid of or not primarily include metal-metal (metallic) bonding between the constituent parts, as is the case for solder.

The term solder is intended to refer to a fusible metal alloy which is used to create a permanent or semi-permanent bond between conductive, typically metallic, components, most commonly in electrical circuitry. The most common form of solders are alloys of lead and tin, but solder will often also include other, or use only other, metals, such as antimony, bismuth, copper, germanium, nickel, indium, silver, and zinc. The term solderless, by contrast, is intended to exclude any of these fusible metal alloys.

Furthermore, the electrically-conductive solderless fixing means may preferable be formed from a material which does not undergo a reversible transformation under the application of thermal energy. Solder can be melted and re-melted to regain flowability so as to be re-used or modified, which can be useful in some circumstances, but during high motor operation temperatures, this becomes deleterious to operation. The electrically-conductive solderless fixing means is intended to avoid this behaviour.

In the depicted embodiment, and as best illustrated in FIG. 3, the electrically-conductive solderless fixing means comprises an electrically-conductive material such as an electrically-conductive adhesive, here formed as a plurality of adhesive joints 34 which are in physical and electrical communication with the electrodes 24 of the varistor 22. The form of the adhesive joints 34 corresponds with those which would be formed by a solder weld and is influenced by the viscosity or fluid flow properties of the adhesive used. For this reason, it may be preferred that a flowable electrically-conductive fixing material is used to secure the varistor 22 to the commutator 20. Such a material may then be able to set in a secure configuration to maintain the position of the varistor 22 relative to the commutator 20.

Any appropriate electrically-conductive adhesive may be considered. An adhesive having a metallic conductive component could be used, such as a silver glue, paste or epoxy resin. Alternatively, an adhesive having a non-metallic conductive component could be used, such as a graphene glue, paste or epoxy resin. The choice of conductive component could, for example, be one or a combination of metallic materials such as silver and/or nickel, or could be formed from non-metallic materials such as carbon-containing conductive materials, such as graphite, graphene, or carbon nanotubes.

The electrically-conductive adhesive does not exhibit the thermal degradation experienced by solder and will therefore remain thermally stable across the operating temperature range of the DC motor, preferably being thermally stable to at least 200° C., and more preferably thermally stable to at least 250° C. or 300° C. Furthermore, the electrically-conductive adhesive may be thermally conductive without exhibiting a propensity towards eutectic reaction with the varistor electrode. The issue with lead-free solder is that the melting point thereof is typically less than 220° C. As such, there is a clear threshold maximum operating temperature for a motor, at the point at which operating temperature exceeds the melting point of the solder. In the present invention, electrically-conductive fillers in the adhesive, such as silver and/or nickel, have melting points which far exceed that of lead-free solder. Metallic filler melting would not occur even when the motor is running in severe high-temperature conditions.

As illustrated, the varistor 22 may be preferably arranged such that the plurality of electrodes 24 of the varistor 22 are provided on an opposite surface to a rotor-facing surface of the varistor 22. This may allow the varistor 22 to be readily located around the commutator 20 during assembly, providing the greatest amount of access for an adhesive applicator to be introduced at or adjacent to the varistor 22 to ensure that fixing can occur.

An alternative rotor assembly, indicated at 110 in FIG. 4, is shown, in which an alternative varistor 122 mounting arrangement is provided. Identical or similar reference numerals to those previous used above will be used to refer to identical or similar components, and further detailed description is omitted for brevity.

In this rotor assembly 110, the plurality of electrodes may be provided on said rotor-facing surface of the varistor 122, which may simplify construction if there is a ledge or lip 136 in communication with the commutator 120 against which the adhesion may occur to form the electrical connection, preferably via a plurality of adhesive joints 134.

The ledge or lip 136 associated with the commutator 120, or indeed any similar support element which preferably extends in a radial direction away from the rotor shaft 118, provides a physical support for the varistor 122 and the electrically-conductive solderless fixing means, thereby improving a stability of the rotor assembly 110.

The ledge or lip 136 may be a continuous lip which extends around a complete perimeter or circumference of the commutator 120, or could be discontinuous, so as to be oriented appropriately to the positions of the electrodes of the varistor 122.

It is thus possible to provide a method of forming a rotor assembly for a DC motor comprising the steps of: providing a rotor having a rotor shaft, and a commutator mounted to the rotor shaft, and then connecting a varistor to the commutator via an electrically-conductive solderless fixing means, such as the electrically-conductive adhesive as described above.

Where such an electrically-conductive adhesive is provided, it may be applied using any one of: dispensing the electrically-conductive adhesive via an adhesive dispenser; screen printing of the electrically-conductive adhesive; 3D printing of the electrically-conductive adhesive; air spraying of the electrically-conductive adhesive; wet dipping of the varistor and/or commutator into the electrically-conductive adhesive; and tape casting of the electrically-conductive adhesive.

To solidify the adhesive once applied, it is preferably cured using any one of: addition curing; heat curing; radiation curing; anaerobic curing; and moisture curing, thereby ensuring that a secure bond is made to the varistor and commutator. A curable electrically-conductive solderless fixing means is useful since, once cured, the reversibility of the application of the fixing means is removed, and therefore will not become flowable once again during the operational temperature of the motor.

There may be alternative methods by which an electrically-conductive solderless fixing means could be achieved. One possibility is indicated in FIG. 5. Again, identical and/or similar reference numerals will be used to refer to identical and/or similar components to those previously described in the above embodiments, and further detailed description is omitted for brevity.

The rotor assembly, indicated at 210, could be by forming a casing 238 for the varistor material 228 from an at least in part electrically-conductive material, thereby forming a varistor 222 which could be aligned to the electrodes and then coupled to the commutator 220 around the rotor shaft 218. One option might be to use an electrically-conductive plastics material which can be overmoulded to the varistor material 228, and which has a high thermal stability over at least the operating temperature of the DC motor. Preferably, the casing 238 may serve to hold the varistor 222 in place relative to the commutator 220, as well as providing the necessary electrical conductivity.

Whilst the present invention is intended for use in the context of a DC motor, it may be desirable to utilise a varistor in combination with an AC commutator motor, in which case, the solderless solution presented would be equally applicable.

Similarly, whilst the present description refers to a solderless electrically-conductive fixing means, it will be apparent that this need not necessarily be formed from a single type of material and could be a composite material or several different materials which are interconnected to provide the electrical connection between the commutator and varistor to form an appropriate solderless electrically-conductive fixing means.

The provision of a solderless electrically-conductive fixing means for a DC motor, to permit connection of the varistor to the commutator, advantageously can improve the mechanical and chemical stability of the motor, which can significantly enhance the operational lifespan thereof.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A rotor assembly for a DC motor, the rotor assembly comprising:
   a rotor having a rotor shaft;
   a commutator mounted to the rotor shaft; and
   a varistor connected to the commutator via an electrically-conductive solderless fixing means, wherein the electrically-conductive solderless fixing means comprises electrically-conductive adhesive;
   wherein the varistor is provided as a looped element sleeved on the commutator, and the commutator extends through the varistor;
   a support element mounted between the commutator and a rotor-facing surface of the varistor to support the varistor, the varistor is provided with a plurality of electrodes on an opposite surface to the rotor-facing surface of the varistor, the electrically-conductive adhesive forms a plurality of adhesive joints between the electrodes of the varistor and the commutator.

2. The rotor assembly as claimed in claim 1, wherein the electrically-conductive adhesive comprises a metallic conductive component.

3. The rotor assembly as claimed in claim 2, wherein the metallic conductive component comprises silver and/or nickel.

4. The rotor assembly as claimed in claim 1, wherein the electrically-conductive adhesive comprises a non-metallic conductive component.

5. The rotor assembly as claimed in claim 4, wherein the non-metallic conductive component comprises graphite, graphene, and/or carbon nanotubes.

6. The rotor assembly as claimed in claim 1, wherein the electrically-conductive solderless fixing means comprises a flowable fixing material.

7. The rotor assembly as claimed in claim 1, wherein the electrically-conductive solderless fixing means comprises a curable material.

8. The rotor assembly as claimed in claim 1, wherein the electrically-conductive solderless fixing means comprises a non-reversibly-applicable fixing means.

9. A DC motor comprising a stator, at least one brush, and a rotor assembly as claimed in claim 1.

* * * * *